US012683880B2

(12) United States Patent
Song et al.

(10) Patent No.: US 12,683,880 B2
(45) Date of Patent: Jul. 14, 2026

(54) METHOD AND APPARATUS OF FAILURE HANDLING FOR TRAFFIC STEERING

(71) Applicant: Telefonaktiebolaget LM Ericsson (publ), Stockholm (SE)

(72) Inventors: Yumei Song, Gothenburg (SE); Fuencisla Garcia Azorero, Madrid (ES); Susana Fernandez Alonso, Madrid (ES); Hong Zhang, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 18/560,167

(22) PCT Filed: Apr. 27, 2022

(86) PCT No.: PCT/EP2022/061132
§ 371 (c)(1),
(2) Date: Nov. 10, 2023

(87) PCT Pub. No.: WO2022/238115
PCT Pub. Date: Nov. 17, 2022

(65) Prior Publication Data
US 2024/0243987 A1    Jul. 18, 2024

(30) Foreign Application Priority Data
May 10, 2021    (EP) ..................................... 21382423

(51) Int. Cl.
*H04L 12/00* (2006.01)
*H04L 41/12* (2022.01)
(Continued)

(52) U.S. Cl.
CPC .......... *H04L 43/0823* (2013.01); *H04L 41/12* (2013.01); *H04L 43/06* (2013.01); *H04W 28/02* (2013.01)

(58) Field of Classification Search
CPC ..... H04L 43/0823; H04L 41/12; H04L 43/06; H04L 41/082; H04L 41/0866;
(Continued)

(56) References Cited

U.S. PATENT DOCUMENTS 8,547,872 B2 * 10/2013 Raleigh .................. G06Q 20/20
                                                          370/252
10,531,420 B2 * 1/2020 Li .......................... H04W 8/065
(Continued)

FOREIGN PATENT DOCUMENTS

EP          3826332 A1 *  5/2021   .............. H04W 4/70
WO   WO-2017080997 A1 *  5/2017   ............ H04M 15/66
(Continued)

OTHER PUBLICATIONS

Author Unknown, "Technical Specification Group Services and System Aspects; System architecture for the 5G System (5GS); Stage 2 (Release 15)," Technical Specification 23.501, Version 15.12.0, Dec. 2020, 3GPP Organizational Partners, 250 pages.
(Continued)

*Primary Examiner* — Frantz Coby
(74) *Attorney, Agent, or Firm* — Withrow & Terranova, PLLC

(57) ABSTRACT

Methods and apparatus for handling failure during traffic steering are provided. In embodiments disclosed herein, a Session Management Function (SMF), a Policy Control Function (PCF), a Packet Data Network Gateway Control Plane (PGW-C), a Policy and Charging Rules Function (PCRF), and/or a User Plane Function (UPF) can be configured to collaboratively handle an error(s) that occurs
(Continued)

during N6-LAN traffic steering, SGi-LAN traffic steering, Application Function (AF) influence traffic steering. Specifically, the methods disclosed herein allow the SMF or the PGW-C to detect the error based on multiple means and report the detected error to the PCF or the PCRF. As a result, it is possible to improve robustness of traffic steering in a communication network.

16 Claims, 10 Drawing Sheets

(51) Int. Cl.
    *H04L 43/06*         (2022.01)
    *H04L 43/0823*     (2022.01)
    *H04W 28/02*      (2009.01)

(58) Field of Classification Search
    CPC ............. H04L 12/1407; H04L 43/0864; H04L 41/0894; H04W 28/02; H04W 4/24; H04W 24/04; H04W 88/16; H04M 15/66
    USPC ......................................................... 370/242
    See application file for complete search history.

(56) References Cited

U.S. PATENT DOCUMENTS

| | | | | |
|---|---|---|---|---|
| 12,088,501 | B2 * | 9/2024 | Li | H04L 47/22 |
| 2014/0105031 | A1 * | 4/2014 | Mcdysan | H04L 45/302 |
| | | | | 370/242 |
| 2018/0192390 | A1 * | 7/2018 | Li | H04W 72/53 |
| 2019/0208379 | A1 * | 7/2019 | Hoffmann | H04W 4/24 |
| 2020/0068653 | A1 * | 2/2020 | Li | H04W 40/34 |
| 2023/0336432 | A1 * | 10/2023 | Muñoz De La Torre Alonso | ....... |
| | | | | H04L 12/1407 |

FOREIGN PATENT DOCUMENTS

| | | | | | |
|---|---|---|---|---|---|
| WO | WO-2019194954 | A1 * | 10/2019 | ............ | H04W 8/065 |
| WO | WO-2021017381 | A1 * | 2/2021 | ............. | H04L 61/58 |
| WO | WO-2021137180 | A1 * | 7/2021 | ............ | H04W 76/12 |

OTHER PUBLICATIONS

Author Unknown, "Technical Specification Group Services and System Aspects; Policy and charging control framework for the 5G System (5GS); Stage 2 (Release 17)," Technical Specification 23.503, Version 17.0.0, Mar. 2021, 3GPP Organizational Partners, 128 pages.

Author Unknown, "Technical Specification Group Core Network and Terminals; Policy and Charging Control (PCC); Reference points (Release 16)," Technical Specification 29.212, Version 16.4.0, Sep. 2020, 3GPP Organizational Partners, 287 pages.

Author Unknown, "Technical Specification Group Core Network and Terminals; 5G System; Session Management Policy Control Service; Stage 3 (Release 16)," Technical Specification 29.512, Version 16.4.0, Mar. 2020, 3GPP Organizational Partners, 186 pages.

Author Unknown, "Technical Specification Group Core Network and Terminals; 5G System; Session Management Policy Control Service; Stage 3 (Release 17)," Technical Specification 29.512, Version 17.2.0, Mar. 2021, 3GPP Organizational Partners, 223 pages.

Ericsson, "C3-213xyz: Failure handling for traffic steering," 3GPP TSG-CT3 Meeting #116e, Mar. 19-28, 2021, Electronic Meeting, 39 pages.

International Search Report and Written Opinion for International Patent Application No. PCT/EP2022/061132, mailed Aug. 12, 2022, 12 pages.

* cited by examiner

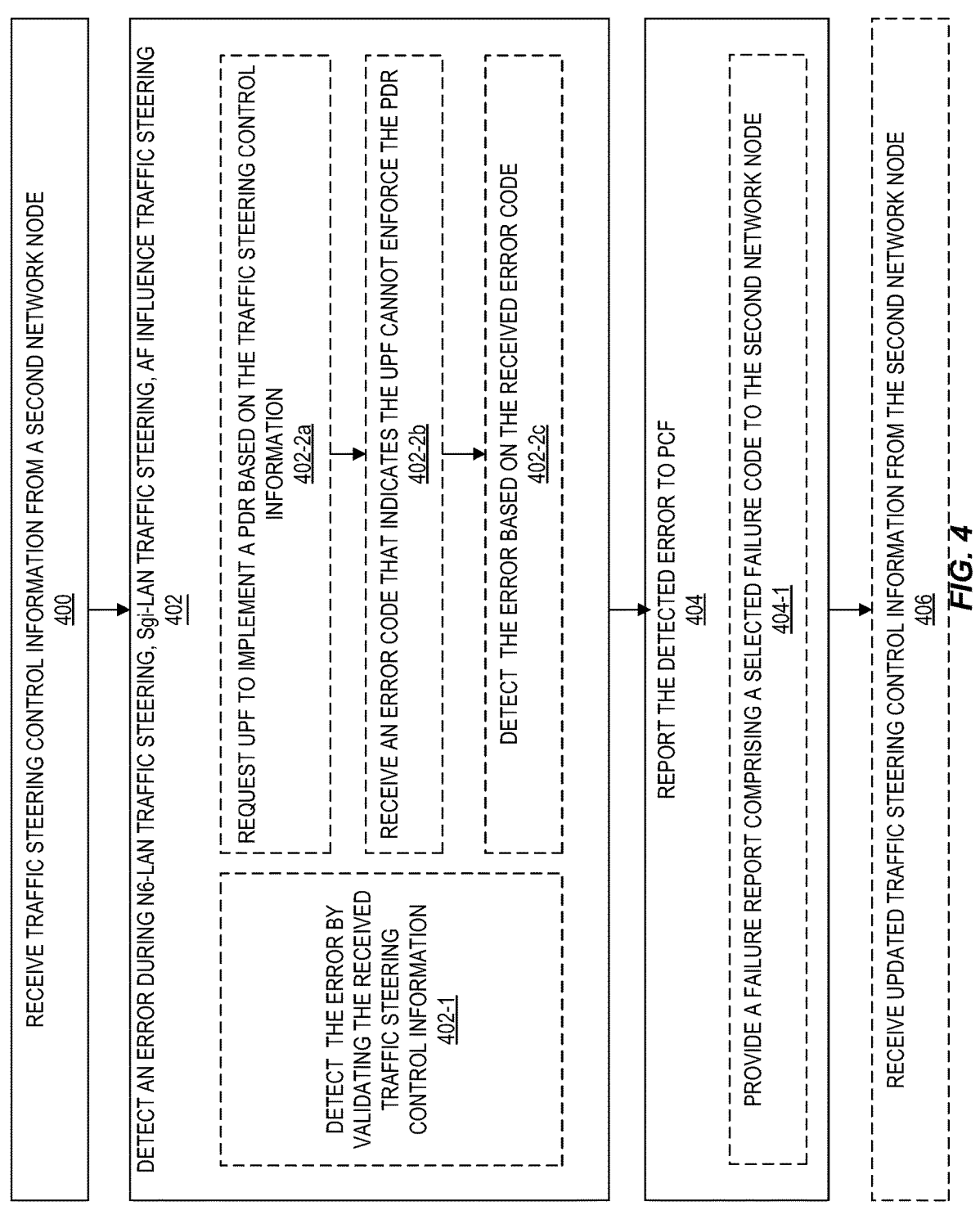

RECEIVE TRAFFIC STEERING CONTROL INFORMATION FROM A SECOND NETWORK NODE
400

DETECT AN ERROR DURING N6-LAN TRAFFIC STEERING, Sgi-LAN TRAFFIC STEERING, AF INFLUENCE TRAFFIC STEERING
402

DETECT THE ERROR BY VALIDATING THE RECEIVED TRAFFIC STEERING CONTROL INFORMATION
402-1

REQUEST UPF TO IMPLEMENT A PDR BASED ON THE TRAFFIC STEERING CONTROL INFORMATION
402-2a

RECEIVE AN ERROR CODE THAT INDICATES THE UPF CANNOT ENFORCE THE PDR
402-2b

DETECT THE ERROR BASED ON THE RECEIVED ERROR CODE
402-2c

REPORT THE DETECTED ERROR TO PCF
404

PROVIDE A FAILURE REPORT COMPRISING A SELECTED FAILURE CODE TO THE SECOND NETWORK NODE
404-1

RECEIVE UPDATED TRAFFIC STEERING CONTROL INFORMATION FROM THE SECOND NETWORK NODE
406

FIG. 4

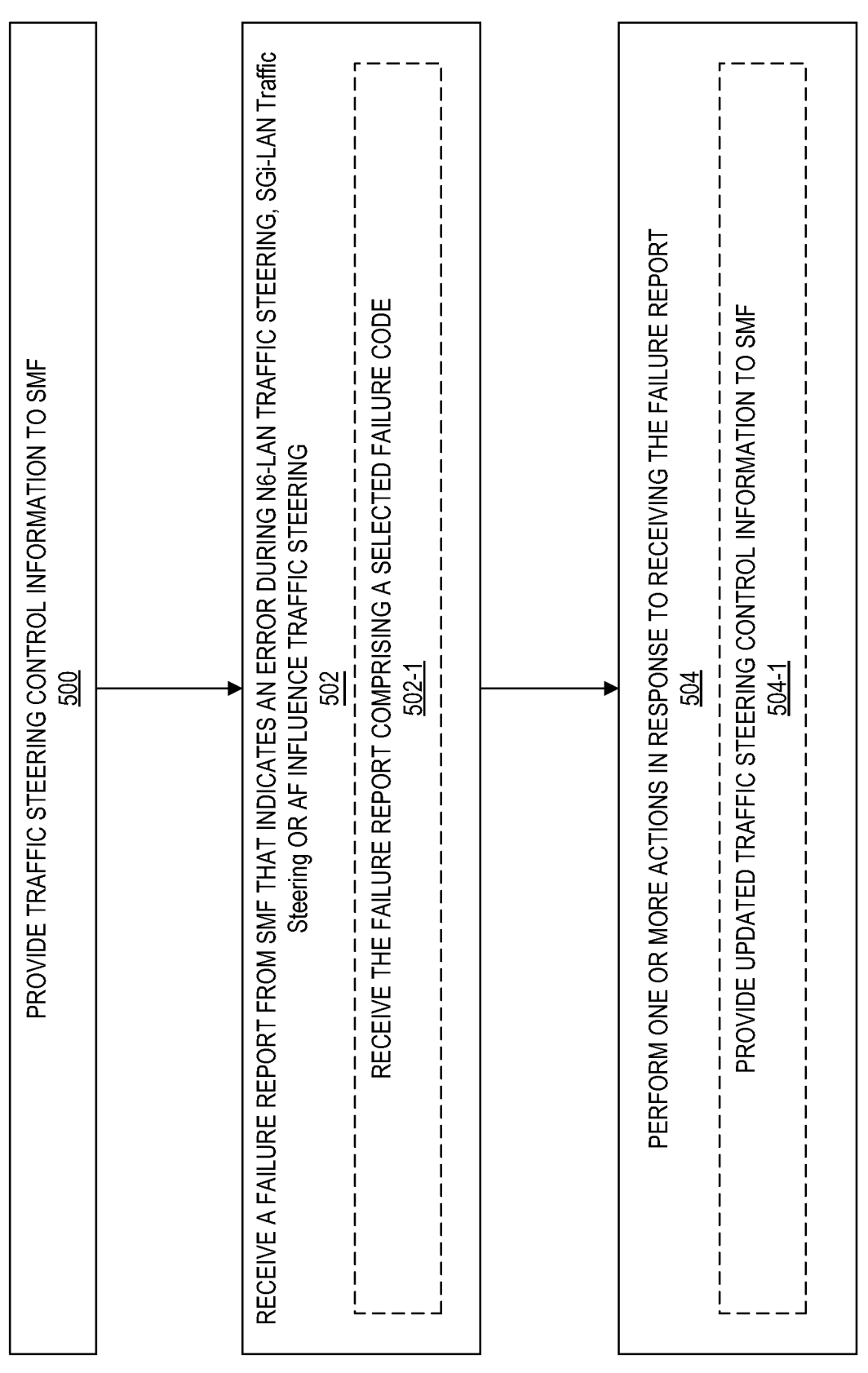

PROVIDE TRAFFIC STEERING CONTROL INFORMATION TO SMF
500

RECEIVE A FAILURE REPORT FROM SMF THAT INDICATES AN ERROR DURING N6-LAN TRAFFIC STEERING, SGi-LAN Traffic Steering OR AF INFLUENCE TRAFFIC STEERING
502

RECEIVE THE FAILURE REPORT COMPRISING A SELECTED FAILURE CODE
502-1

PERFORM ONE OR MORE ACTIONS IN RESPONSE TO RECEIVING THE FAILURE REPORT
504

PROVIDE UPDATED TRAFFIC STEERING CONTROL INFORMATION TO SMF
504-1

FIG. 5

RECEIVE A REQUEST FROM SMF TO IMPLEMENT A PDR BASED ON TRAFFIC STEERING CONTROL INFORMATION RECEIVED BY THE SMF
600

PROVIDE AN ERROR CODE TO THE SMF IN RESPONSE TO THE UPF BEING UNABLE TO ENFORCE THE PDR
602

METHOD AND APPARATUS OF FAILURE HANDLING FOR TRAFFIC STEERING

This application is a 35 U.S.C. § 371 national phase filing of International Application No. PCT/EP2022/061132, filed Apr. 27, 2022, which claims the benefit of European Patent Application No. 21382423.8, filed May 10, 2021, the disclosures of which are incorporated herein by reference in their entireties.

TECHNICAL FIELD

The technology of the disclosure relates generally to failure handling during traffic steering.

BACKGROUND

According to 3GPP TS23.503 V17.0.0 (2021 March) chapter 4.3.7, Traffic Steering Control refers to the capability to activate/deactivate traffic steering policies from the PCF in the SMF for the purpose of:

steering the subscriber's traffic to appropriate operator third party service functions (e.g., Network Address Translation (NAT), antimalware, parental control, Distributed Denial-of-Service (DDOS) protection) in the N6-LAN or 5G-LAN type of services. This is supported in non-roaming and home-routed scenarios only. In a non-limiting example, N6-LAN refers to a portion of the 5G network that carries data from the User Plane Function (UPF) to the Internet.

Application Function (AF) influenced traffic diversion that enables the routing of the user traffic matching the traffic filters provided in the Policy and Change Control (PCC) rule to a local Data Network identified by the Data Network Access Identifier (DNAI) per AF request. This is supported in non-roaming and Local Break Out (LBO) scenarios only, as described in TS 23.501, clause 5.6.7.

SUMMARY

3GPP TS29.512 describes how to support the traffic steering control in chapter 4.2.6.2.6, and PCC rule error report in chapters 4.2.3.16 and 4.2.4.15 in the event of PCC rule validation error and/or enforcement error. And chapter 5.6.3.9 defines the failure code can be used to report the error.

However, there is no mechanism to report failure to Policy Control Function (PCF) for traffic steering. Embodiments disclosed herein include methods for handling failure during traffic steering. In embodiments disclosed herein, a Session Management Function (SMF), a Policy Control Function (PCF), a Packet Data Network Gateway Control Plane (PGW-C), a Policy and Charging Rules Function (PCRF), and/or a User Plane Function (UPF) can be configured to collaboratively handle an error(s) that occurs during N6-LAN traffic steering, SGi-LAN traffic steering, Application Function (AF) influence traffic steering. Specifically, the methods disclosed herein allow the SMF or the PGW-C to detect the error based on multiple means and report the detected error to the PCF or the PCRF. As a result, it is possible for PCF or PCRF to be aware of the error and optionally update the traffic steering information of the PCC rule, and may improve robustness of traffic steering in a communication network.

In one embodiment, a method performed by a network node in a Core Network (CN) for handling a failure during traffic steering is provided. The method includes receiving traffic steering control information from a second network node. The method also includes detecting an error during any one of: N6-LAN Traffic Steering, SGi-LAN Traffic Steering, Application Function (AF) Influence Traffic Steering. The method also includes reporting the detected error to the second network node.

In one embodiment, wherein detecting the error comprises detecting the error by validating the received traffic steering control information.

In one embodiment, the method also includes requesting a UPF to implement a Packet Detection Rule (PDR) based on the traffic steering control information and receiving an error code that indicates the UPF cannot enforce the PDR.

In one embodiment, wherein detecting the error comprises detecting the error based on the received error code.

In one embodiment, wherein reporting the detected error comprises providing a failure report comprising a selected failure code to the second network node (i.e., PCF or PCRF).

In one embodiment, the selected failure code includes any of TRAFFIC_STEERING_ERROR and DNAI_STEERING_ERROR.

In one embodiment, the method also includes receiving an updated traffic steering control information from the second network node, wherein the updated traffic steering control information is determined based on the detected error.

In one embodiment, the network node comprises a Session Management Function, SMF and the second network node comprises a PCF.

In one embodiment, the network node comprises a PGW-C and the second network node comprises a PCRF.

In another embodiment, a method performed by a second network node (i.e., PCF or PCRF) in a CN for handling a failure during traffic steering is provided. The method includes receiving a failure report from a network node (i.e., SMF or PWG-C) that indicates an error during any one of: N6-LAN Traffic Steering; and AF Influence Traffic Steering. The method also includes performing one or more actions in response to receiving the failure report.

In one embodiment, the method also includes providing traffic steering control information to the network node (i.e., SMF or PWG-C).

In one embodiment, wherein receiving the failure report comprises receiving the failure report comprising a selected failure code.

In one embodiment, the selected failure code includes any of TRAFFIC_STEERING_ERROR and DNAI_STEERING_ERROR.

In one embodiment, wherein performing one or more actions comprises providing an updated traffic steering control information to the network node (i.e., SMF or PWG-C), wherein the updated traffic steering control information is determined based on the failure report.

In another embodiment, a method performed by a UPF for handling a failure during traffic steering is provided. The method includes receiving a request from an SMF in a CN to implement a PDR based on a traffic steering control information received by the SMF. The method also includes providing an error code to the SMF in response to the UPF being unable to enforce the PDR.

In another embodiment, a network node is provided. The network node includes processing circuitry. The processing circuitry is configured to cause the network node to receive traffic steering control information from a second network node. The processing circuitry is also configured to cause the network node to detect an error during any one of: N6-LAN Traffic Steering, SGi-LAN Traffic Steering, AF Influence Traffic Steering. The processing circuitry is also configured to cause the network node to report the detected error to the second network node.

In one embodiment, the processing circuitry is further configured to cause the network node to perform any of the steps performed by the network node.

In another embodiment, a second network node is provided. The second network node includes processing circuitry. The processing circuitry is configured to cause the network node to provide traffic steering control information to a network node (i.e., SMF, PGW-C). The processing circuitry is also configured to cause the network node to receive a failure report from the SMF that indicates an error during any one of: N6-LAN Traffic Steering, SGi-LAN Traffic Steering, and AF Influence Traffic Steering. The processing circuitry is also configured to cause the network node to perform one or more actions in response to receiving the failure report.

In one embodiment, the processing circuitry is configured to cause the network node to perform any of the steps performed by the PCF or PCRF.

In another embodiment, a network node is provided. The network node includes processing circuitry. The processing circuitry is configured to cause the network node to receive a request from an SMF or PGW-C in a CN to implement a PDR based on traffic steering control information received by the SMF or PGW-C. The processing circuitry is also configured to cause the network node to provide an error code to the SMF or PGW-C in response to the UPF being unable to enforce the PDR.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 is a flowchart of an exemplary method performed by a network node, such as a Session Management Function (SMF) or a Packet Data Network Gateway Control Plane (PGW-C), in a Core Network (CN) for handling a failure during traffic steering;

FIG. 5 is a flowchart of an exemplary method performed by a Policy Control Function (PCF) or PCRF in a CN for handling a failure during traffic steering;

DETAILED DESCRIPTION

Figure 1:
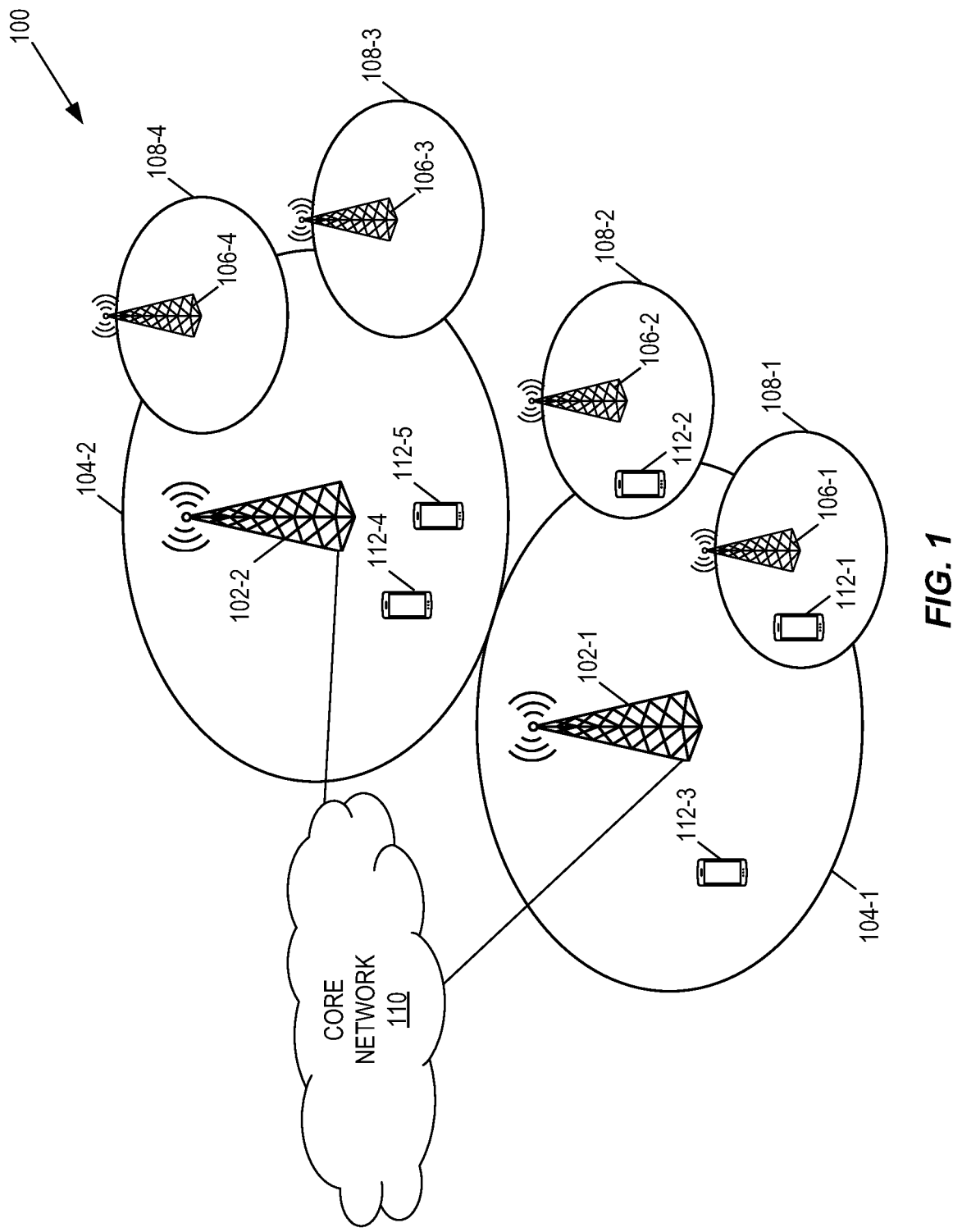
FIG. 1 illustrates one example of a cellular communications system according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IOT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist a certain challenge(s). The current 3GPP specification 29.512 does not have the option for SMF to report the failure for traffic steering:

N6-LAN Traffic Steering:
Where the Traffic steering policy identifier(s) UL and DL are preconfigured in UPF
AF influence Traffic Steering:
Where PCF provision routeToLocs, which is defined as:

| dnai | Dnai | M | 1 | Identifies the location of the application. |
|------|------|---|---|---|
| routeInfo | RouteInformation | C | 0 ... 1 | Includes the traffic routing information. |
| routeProfId | string | C | 0 ... 1 | Identifies the routing profile Id. |

1. For N6-LAN Traffic Steering, the Traffic steering policy identifier(s) referred by PCC rule may not exist in UPF. In this case, if SMF includes the Traffic steering policy identifier(s) UL and DL to UPF in Forward Action Rule (FAR) when the PCC is installed, activated, and/or modified, the UPF may return error cause code 70 (Invalid Forwarding Policy) to SMF. In another case, the UPF cannot enforce the rule due to congestion control, the UPF may return 74 (PFCP entity in congestion).

This is also applicable for SGi-lan traffic steering over Gx interface in EPC network. PCRF provisioned traffic steering policy identifiers referred by PCC rule, the enforcement of the PDRs for the PCC rule in PGW-U failed, e.g., failure due to missing traffic steering policy identifiers.

2. For AF influenced traffic steering case, in case of a routeToLocs validation error, an option is to use 400 with OPTIONAL_IE_INCORRECT if all PCC rules with DNAI failed, wherein which parameter incorrect is not specified. In case of one PCC rule failure, there is no suitable failure code in 200 Partial Success at rule install. Or, if failure happens when enforcing the AF influenced traffic steering in UPF (e.g, due to UPF congestion control), no suitable failure code for enforcement failure.

For above cases, there is no suitable failure code to be used by SMF to report the error to PCF (and PCF further forward to AF) so that PCF can become aware of the reason and optionally update the traffic steering information of the PCC rule. The user traffic can experience no disturbance. For EPC SGi-LAN traffic steering case, there is no suitable failure code to be used by PGW-C to report the error to PCRF so that PCRF can become aware of the reason and optionally update the traffic steering information of the PCC rule.

Certain aspects of the present disclosure and their embodiments may provide solutions to the aforementioned or other challenges. Embodiments disclosed herein introduce an option for SMF/PGW-C to notify PCF/PCRF about:

1) N6-LAN Traffic Steering validation error or enforcement error,
2) AF Influenced Traffic Steering validation error or enforcement error,
3) SGi-LAN Traffic Steering validation error or enforcement error.

There are, proposed herein, various embodiments which address one or more of the issues disclosed herein.

Certain embodiments may provide one or more of the following technical advantage(s). Specifically, SMF/PGW-C reports to PCF/PCRF when the traffic steering validation error or enforcement error happens. Accordingly, PCF/PCRF can reflect the error and provision the new traffic steering policy decision based on the received error report.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC). In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or RRHs, or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
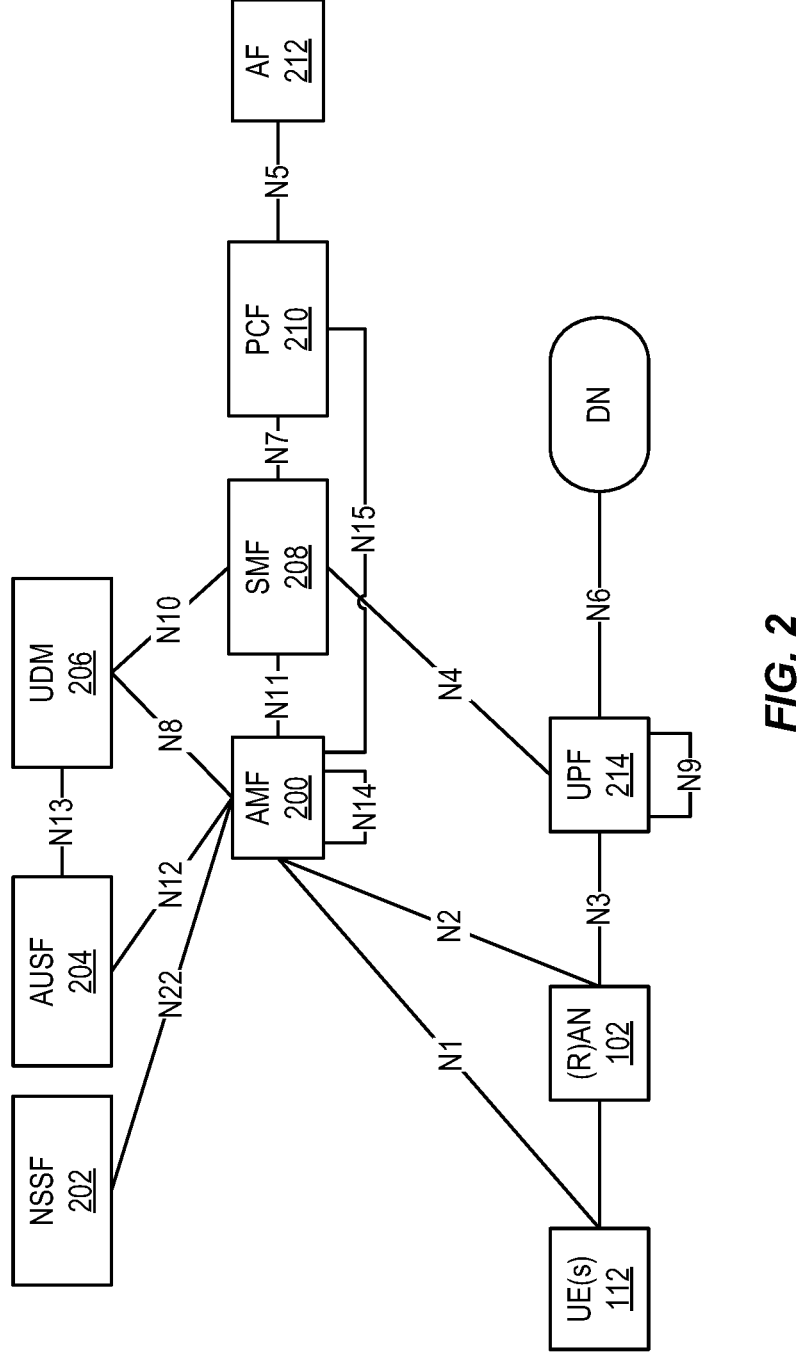
FIGS. 2 and 3 illustrate example embodiments in which the cellular communication system of FIG. 1 is a Fifth Generation (5G) System (5GS)

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g., such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating UP and CP. The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
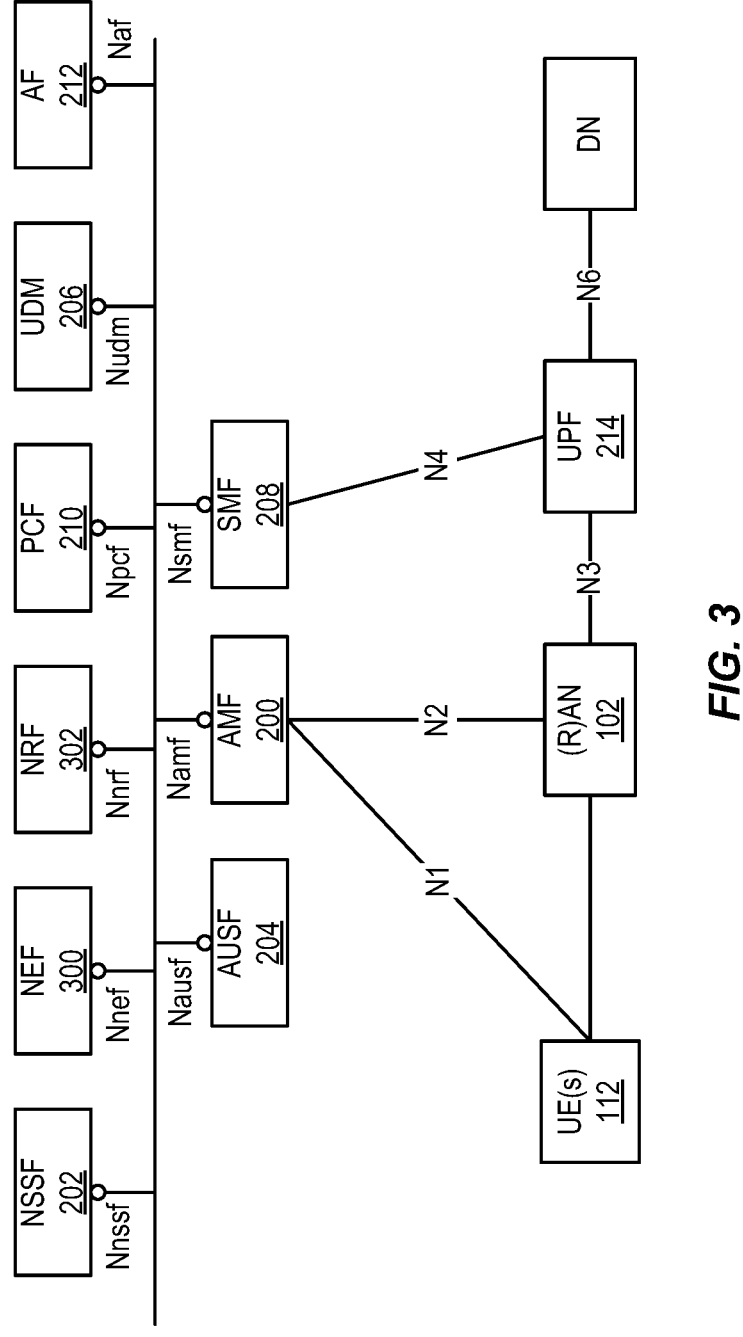

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 6:
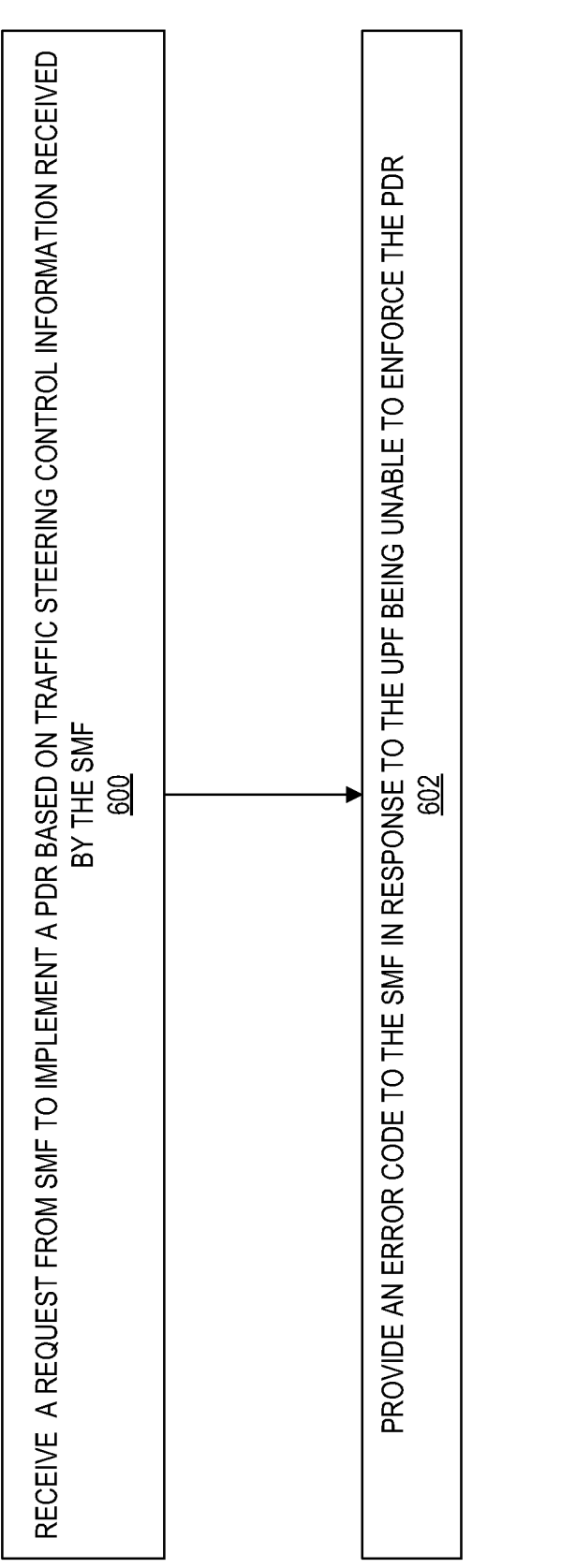
FIG. 6 is a flowchart of an exemplary method performed by a User Plane Function (UPF) for handling a failure during traffic steering.

FIG. 4 is a flowchart of an exemplary method performed by a network node, such as an SMF or a PGW-C, in a CN for handling a failure during traffic steering. In a non-limiting example, the network node can be an SMF or a Packet Data Network Gateway Control Plane (PGW-C). The network node receives traffic steering control information from a second network node (step 400). In a non-limiting example, the second network node can be a PCF or a Policy and Charging Rules Function (PCRF). The network node FIG. 6 is a flowchart of an exemplary method performed by a UPF for handling a failure during traffic steering. The UPF receives a request from an SMF to implement a PDR based on traffic steering control information received by the SMF (step 600). The UPF can provide an error code to the SMF in response to the UPF being unable to enforce the PDR (step 602).

Specific embodiments of the present disclosure are now discussed. In an embodiment of the present disclosure, the following data types are to be added to Table 5.6.3.9-1: Enumeration FailureCode in Chapter 5.6.3.9 of 3GPP TS 29.512.

| Enumeration value | Description | Applicability |
|---|---|---|
| TRAFFIC_STEERING_ERROR | This value is used to indicate that: the enforcement of the steering of traffic to the N6-LAN or 5G-LAN failed; or the dynamic PCC rule could not be successfully installed/modified at the NF service consumer because e.g., there is an invalid traffic steering policy identifier(s) within the provided Traffic Control Data policy decision to which the PCC rule refers. | |
| DNAI_STEERING_ERROR | This value is used to indicate that: the enforcement of the steering of traffic to the indicated DNAI failed; or the dynamic PCC rule could not be successfully installed/modified at the NF service consumer because there is invalid route information for a DNAI(s) (e.g., routing profile id is not configured) within the provided Traffic Control Data policy decision to which the PCC rule refers. | | can detect an error during N6-LAN traffic steering, SGi-LAN traffic steering, AF influence traffic steering (step 402). In one embodiment, the network may detect the error by evaluating the received traffic steering control information (402-1). In another embodiment, the network node may request a UPF to implement a Packet Detection Rule (PDR) based on the received traffic steering control information (step 402-2*a*). The network node may receive an error code that indicates the UPF cannot enforce the PDR (step 402-2*b*). Accordingly, the network node may detect the error based on the error code received from the UPF (step 402-2*c*). Accordingly, the network node can report detected error to the second network node (step 404). In a non-limiting example, the network node can provide a failure report that includes a selected failure code to the PCF (step 404-1). The network node may receive updated traffic steering control information from the second network node (step 406**).

FIG. 5 is a flowchart of an exemplary method performed by a PCF or PCRF in a CN for handling a failure during traffic steering. The PCF or PCRF provides traffic steering control information to an SMF or PGW-C (step 500). The PCF or PCRF receives a failure report from the SMF or PGW-C that indicates an error during N6-LAN traffic steering or SGi-LAN Traffic Steering, and/or AF influence traffic steering (step 502). The PCF or PCRF may receive the failure report that includes a selected failure code (step 502-1). Accordingly, the PCF or PCRF performs one or more actions in response to receiving the failure report (step 504). In a non-limiting example, the PCF or PCRF can provide updated traffic steering control information to the SMF or PWG-C (step 504-1).

Figure 7:
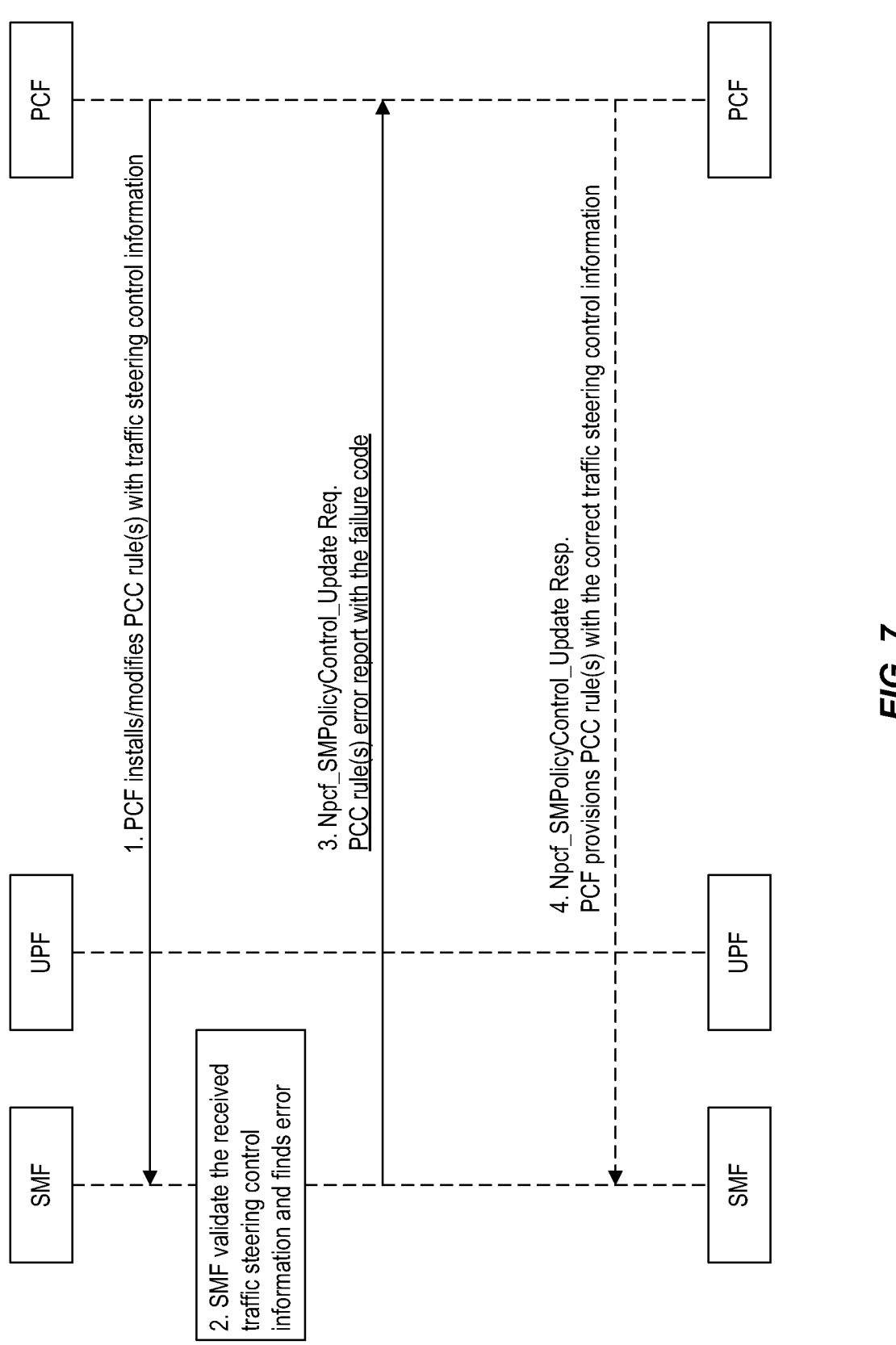
FIG. 7 is a flowchart of an exemplary failure handling signaling according to an embodiment of the present disclosure.

In an embodiment of the present disclosure, the following data types are to be added to Rule-Failure-Code AVP in Chapter 5.3.8 of 3GPP TS 29.212:

TRAFFIC_STEERING_ERROR: This value is used to indicate that:

the enforcement of the steering of traffic to the SGi-LAN;

FIG. 7 is a flowchart of an exemplary failure handling signaling according to an embodiment of the present disclosure.

Step 1: PCF provisions new or modifies existing policy decision with traffic steering control information (e.g., steps 400, 500).

Step 2: SMF validates PCF provisioned policy decision (e.g., step 402-1). SMF detects an error(s) during N6-LAN Traffic Steering and/or AF Influence Traffic Steering.

Step 3: SMF reports the error to PCF using SmPolicy_Update Request including error reports to indicate the error (e.g., steps 404, 502).

Step 4: PCF makes corresponding decision, and may provision updated new decision if applicable, based on the reported error (e.g., steps 406, 504-1).

Figure 8:
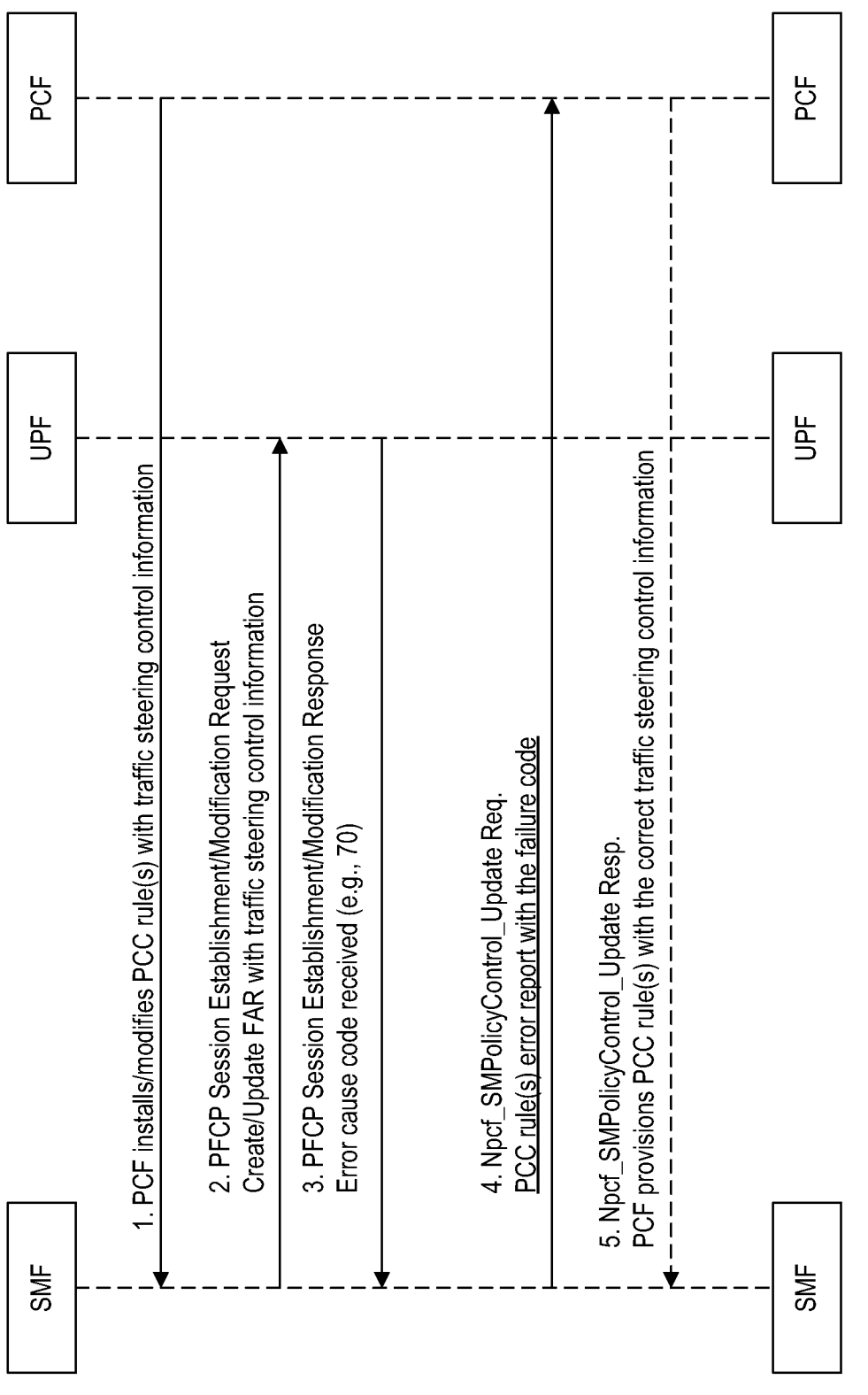
FIG. 8 is a flowchart of an exemplary failure handling signaling according to another embodiment of the present disclosure.

FIG. 8 is a flowchart of an exemplary failure handling signaling according to another embodiment of the present disclosure.

Step 1: PCF provisions new or updates existing policy decision with traffic steering control information (e.g., 400, 500).

Step 2: SMF validates PCF provisioned traffic steering control information and then enforces the PCC rule(s).

Step 3: UPF cannot enforce a Packet Detection Rule(s) (PDR(s)) during N6-LAN Traffic Steering and/or AF Influence Traffic Steering and returns an error(s) to SMF (e.g., steps 402-2*b*, 602**).

Step 4: SMF reports the error to PCF using SmPolicy_Update Request including an error report(s) that indicates the error (e.g., steps 404, 502).

Step 5: PCF makes the corresponding decision, and may provision updated new decision if applicable, based on the report error (e.g., steps 406, 504-1).

Figure 9:
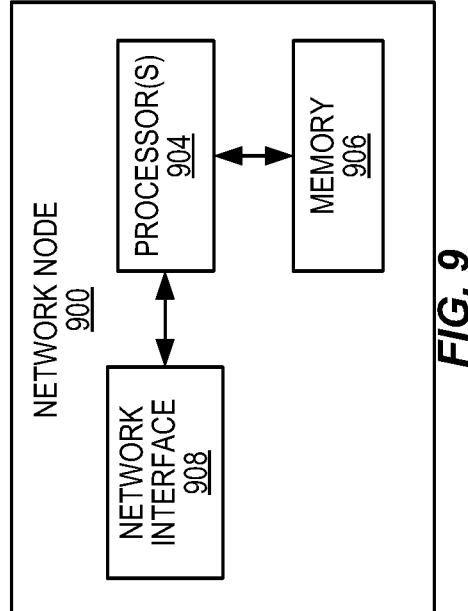
FIG. 9 is a schematic block diagram of a network node according to some embodiments of the present disclosure.

FIG. 9 is a schematic block diagram of a network node 900 according to some embodiments of the present disclosure. The network node 900 may be, for example, a core network node (e.g., SMF, PCF, PGW-C, PCRF). As illustrated, the network node 900 includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. The one or more processors 904 operate to provide one or more functions of the network node 900 as described herein (e.g., one or more functions of SMF, PCF, PGW-C, PCRF as described herein). In some embodiments, the function(s) are implemented in software that is stored, e.g., in the memory 906 and executed by the one or more processors 904.

Figure 10:
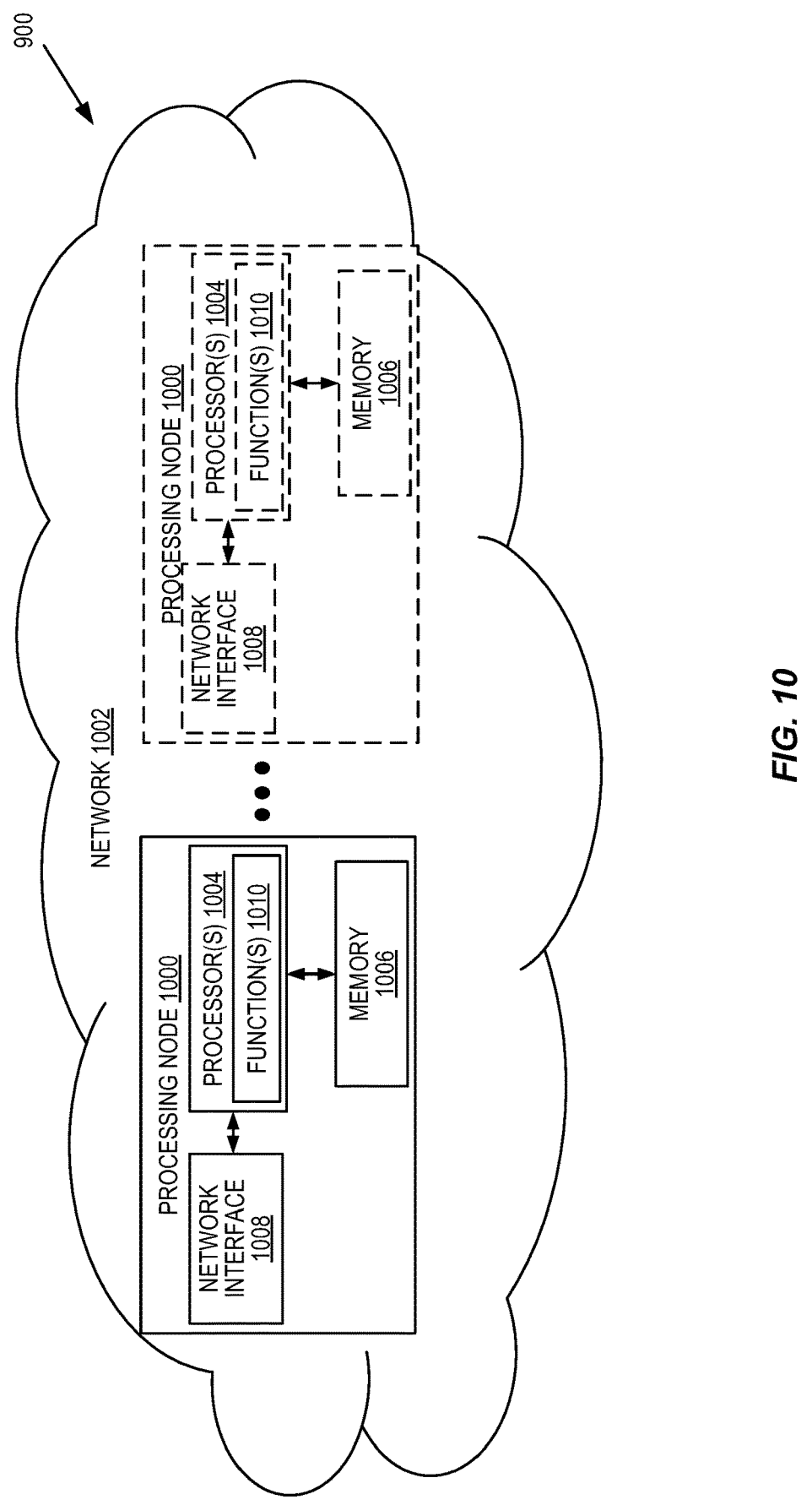
FIG. 10 is a schematic block diagram that illustrates a virtualized embodiment of the network node 900 according to some embodiments of the present disclosure.

FIG. 10 is a schematic block diagram that illustrates a virtualized embodiment of the network node 900 according to some embodiments of the present disclosure. Optional features are represented by dashed boxes. As used herein, a "virtualized" network node is an implementation of the network node 900 in which at least a portion of the functionality of the network node 900 is implemented as a virtual component(s) (e.g., via a virtual machine(s) executing on a physical processing node(s) in a network(s)). As illustrated, in this example, the network node 900 includes one or more processing nodes 1000 coupled to or included as part of a network(s) 1002. Each processing node 1000 includes one or more processors 1004 (e.g., CPUs, ASICs, FPGAS, and/or the like), memory 1006, and a network interface 1008. In this example, functions 1010 of the network node 900 described herein (e.g., one or more functions of SMF, PCF, PGW-C, PCRF as described herein) are implemented at the one or more processing nodes 1000 or distributed across the two or more processing nodes 1000 in any desired manner. In some particular embodiments, some or all of the functions 1010 of the network node 900 described herein are implemented as virtual components executed by one or more virtual machines implemented in a virtual environment(s) hosted by the processing node(s) 1000.

In some embodiments, a computer program including instructions which, when executed by at least one processor, causes the at least one processor to carry out the functionality of the network node 900 or a node (e.g., a processing node 1000) implementing one or more of the functions 1010 of the network node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
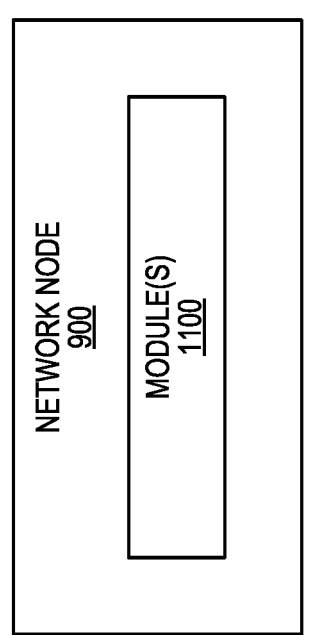
FIG. 11 is a schematic block diagram of the network node 900 according to some other embodiments of the present disclosure.

FIG. 11 is a schematic block diagram of the network node 900 according to some other embodiments of the present disclosure. The network node 900 includes one or more modules 1100, each of which is implemented in software. The module(s) 1100 provide the functionality of the network node 900 described herein. This discussion is equally applicable to the processing node 1000 of FIG. 10 where the modules 1100 may be implemented at one of the processing nodes 1000 or distributed across multiple processing nodes 1000.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

| 3GPP | Third Generation Partnership Project |
| 5G | Fifth Generation |
| 5GC | Fifth Generation Core |
| 5GS | Fifth Generation System |
| AF | Application Function |
| AMF | Access and Mobility Function |
| AN | Access Network |
| AP | Access Point |
| ASIC | Application Specific Integrated Circuit |
| AUSF | Authentication Server Function |
| CPU | Central Processing Unit |
| DCI | Downlink Control Information |
| DDoS | Distributed Denial-of-Service |
| DN | Data Network |
| DNAI | Data Network Access Identifier |
| DSP | Digital Signal Processor |
| eNB | Enhanced or Evolved Node B |
| EPS | Evolved Packet System |
| E-UTRA | Evolved Universal Terrestrial Radio Access |
| FAR | Forward Action Rule |
| FPGA | Field Programmable Gate Array |
| gNB | New Radio Base Station |
| gNB-DU | New Radio Base Station Distributed Unit |
| HSS | Home Subscriber Server |
| IoT | Internet of Things |
| IP | Internet Protocol |
| LBO | Local Break Out |
| LTE | Long Term Evolution |
| MAC | Medium Access Control |
| MME | Mobility Management Entity |
| MTC | Machine Type Communication |
| NAT | Network Address Translation |
| NEF | Network Exposure Function |
| NF | Network Function |
| NR | New Radio |

US 12,683,880 B2

13

-continued

| NRF | Network Function Repository Function |
| NSSF | Network Slice Selection Function |
| OTT | Over-the-Top |
| PC | Personal Computer |
| PCC | Policy and Change Control |
| PCF | Policy Control Function |
| PCRF | Policy and Charging Rules Function |
| PDR | Packet Detection Rule |
| PDSCH | Physical Downlink Shared Channel |
| P-GW | Packet Data Network Gateway |
| PGW-C | Packet Data Network Gateway Control Plane |
| PRS | Positioning Reference Signal |
| QoS | Quality of Service |
| RAM | Random Access Memory |
| RAN | Radio Access Network |
| ROM | Read Only Memory |
| RP | Reception Point |
| RRH | Remote Radio Head |
| RTT | Round Trip Time |
| SCEF | Service Capability Exposure Function |
| SMF | Session Management Function |
| TCI | Transmission Configuration Indicator |
| TP | Transmission Point |
| TRP | Transmission/Reception Point |
| UDM | Unified Data Management |
| UE | User Equipment |
| UPF | User Plane Function |

Those skilled in the art will recognize improvements and modifications to the embodiments of the present disclosure. All such improvements and modifications are considered within the scope of the concepts disclosed herein.

The invention claimed is:

1. A method performed by a network node in a Core Network, CN, for handling a failure during traffic steering, comprising:
    receiving traffic steering control information from a second network node;
    detecting an error during any one of:
        N6-Local Area Network, LAN, Traffic Steering;
        SGi-LAN Traffic Steering;
        Application Function, AF, Influence Traffic Steering; and
        reporting the detected error to the second network node;
    requesting a User Plane Function, UPF, to implement a Packet Detection Rule, PDR, based on the traffic steering control information; and
    receiving an error code that indicates the UPF cannot enforce the PDR.

2. The method of claim 1, wherein detecting the error comprises detecting the error by validating the received traffic steering control information.

3. The method of claim 1, wherein detecting the error comprises detecting the error based on the received error code.

4. The method of claim 1, wherein reporting the detected error comprises providing a failure report comprising a selected failure code to the second network node.

5. The method of claim 4, wherein the selected failure code comprises any of:
    TRAFFIC_STEERING_ERROR indicating one of the following failures:
        a failure related to enforcement of traffic steering at SGI-LAN, N6-LAN or Fifth Generation, 5G-LAN; and
        a failure related to implementation of a Policy and Charging Control, PCC, rule at a Network Function, NF, service consumer; and

DNAI_ROUTE_ERROR indicating one of the following failures:
        a failure related to enforcement of traffic steering associated with a Data Network Access Identifier, DNAI; and
        a failure related to implementation of the PCC rule at the NF service consumer.

6. The method of claim 1, further comprising receiving an updated traffic steering control information from the second network node, wherein the updated traffic steering control information is determined based on the detected error.

7. The method of claim 1, wherein the network node comprises a Session Management Function, SMF and the second network node comprises a Policy Control Function, PCF.

8. The method of claim 1, wherein the network node comprises a Packet Data Network Gateway Control Plane, PGW-C, and the second network node comprises a Policy and Charging Rules Function, PCRF.

9. A method performed by a second network node (i.e., a Policy Control Function, PCF or Policy and Charging Rules Function, PCRF, in a Core Network, CN, for handling a failure during traffic steering, comprising:
    providing traffic steering control information to a network node (i.e., a Session Management Function, SMF or Packet Data Network Gateway Control Plane, PGW-C);
    receiving a failure report from the network node that indicates an error during any one of:
        N6-LAN Traffic Steering;
        SGi-LAN Traffic Steering;
        Application Function, AF, Influence Traffic Steering; and
        performing one or more actions in response to receiving the failure report.

10. The method of claim 9, wherein receiving the failure report comprises receiving the failure report comprising a selected failure code.

11. The method of claim 10, wherein the selected failure code comprises any of:
    TRAFFIC_STEERING_ERROR indicating one of the following failures:
        a failure related to enforcement of traffic steering at SGI-LAN, N6-LAN or 5G-LAN; and
        a failure related to implementation of the PCC rule at a Network Function, NF, service consumer; and
    DNAI_ROUTE_ERROR indicating one of the following failures:
        a failure related to enforcement of traffic steering associated with a Data Network Access Identifier, DNAI; and
        a failure related to implementation of the PCC rule at the NF service consumer.

12. The method of claim 9, wherein performing one or more actions comprises providing an updated traffic steering control information to the network node, wherein the updated traffic steering control information is determined based on the failure report.

13. A method performed by a User Plane Function, UPF, for handling a failure during traffic steering, comprising:
    receiving a request from a Session Management Function, SMF, in a Core Network, CN, to implement a Packet Detection Rule (PDR) based on traffic steering control information received by the SMF; and
    providing an error code to the SMF in response to the UPF being unable to enforce the PDR.

14. A network node comprising processing circuitry configured to cause the network node to:

receive traffic steering control information from a second network node;

detect an error during any one of:

N6-LAN Traffic Steering;

SGi-LAN Traffic Steering;

Application Function, AF, Influence Traffic Steering; and report the detected error to the second network node;

request a User Plane Function, UPF, to implement a Packet Detection Rule (PDR) based on the traffic steering control information; and receive an error code that indicates the UPF cannot enforce the PDR.

15. A second network node comprising processing circuitry configured to cause the network node to:

provide traffic steering control information to a network node;

receive a failure report from the network node that indicates an error during any one of:

N6-Local Area Network, LAN, Traffic Steering;

SGi-LAN Traffic Steering;

Application Function, AF, Influence Traffic Steering; and perform one or more actions in response to receiving the failure report.

16. A network node comprising processing circuitry configured to cause the network node to:

receive a request from a Session Management Function, SMF, in a Core Network, CN, to implement a Packet Detection Rule (PDR) based on traffic steering control information received by the SMF; and provide an error code to the SMF in response to the UPF being unable to enforce the PDR.

\* \* \* \* \*